United States Patent [19]

Slone

[11] Patent Number: 5,025,130
[45] Date of Patent: Jun. 18, 1991

[54] VEHICLE HEATING DEVICE

[76] Inventor: Michael D. Slone, 5677 Crievewood Dr., Memphis, Tenn. 38135

[21] Appl. No.: 448,346

[22] Filed: Dec. 11, 1989

[51] Int. Cl.⁵ .............................................. B60L 1/02
[52] U.S. Cl. ................................. 219/203; 237/12.3 R
[58] Field of Search ..................... 237/12.3 A, 12.3 R; 219/203, 202, 365; 34/97

[56] References Cited

U.S. PATENT DOCUMENTS

| | | |
|---|---|---|
| 2,102,418 | 12/1937 | Kirsch . |
| 2,121,753 | 6/1938 | Cornell, Jr. . |
| 2,415,740 | 2/1947 | Gammack . |
| 3,745,906 | 7/1973 | Kakei et al. . |
| 4,105,246 | 8/1978 | Trumbull . |
| 4,757,183 | 7/1988 | Karey et al. ........................ 34/97 X |
| 4,847,468 | 7/1989 | Hutstetler ................... 237/12.3 A X |
| 4,874,921 | 10/1989 | Gerbig ........................ 237/12.3 A X |

Primary Examiner—Henry A. Bennett
Attorney, Agent, or Firm—Jerry T. Kearns

[57] ABSTRACT

A vehicle heating device includes a housing containing a rechargeable battery in a recharging unit which is selectively connectable to an AC or a DC power supply source for maintaining the battery in a charged condition. The housing is in the form of a case having a hinged lid and an interior provided with a plurality of storage receptacles for storing and transporting a blower assembly and a pair of vent conduits. The blower assembly includes an electric fan for discharging air through two heated air outlet apertures. Preferably, electrical resistance heating elements are utilized to heat air within the blower assembly. The vent conduits comprise elongated flexible corrugated tubes each provided with a plurality of spaced vent apertures. The vent conduits are removably connectable to the blower assembly air outlet apertures. In use, the blower assembly and vent conduits are supported in spaced relation above a vehicle dashboard by a plurality of support stands. A power cord connects the blower assembly to the rechargeable battery, and a timer in the housing may be set to activate the blower fan and heating elements at a predetermined time to heat the interior of a vehicle and to defrost the vehicle windshield.

5 Claims, 5 Drawing Sheets

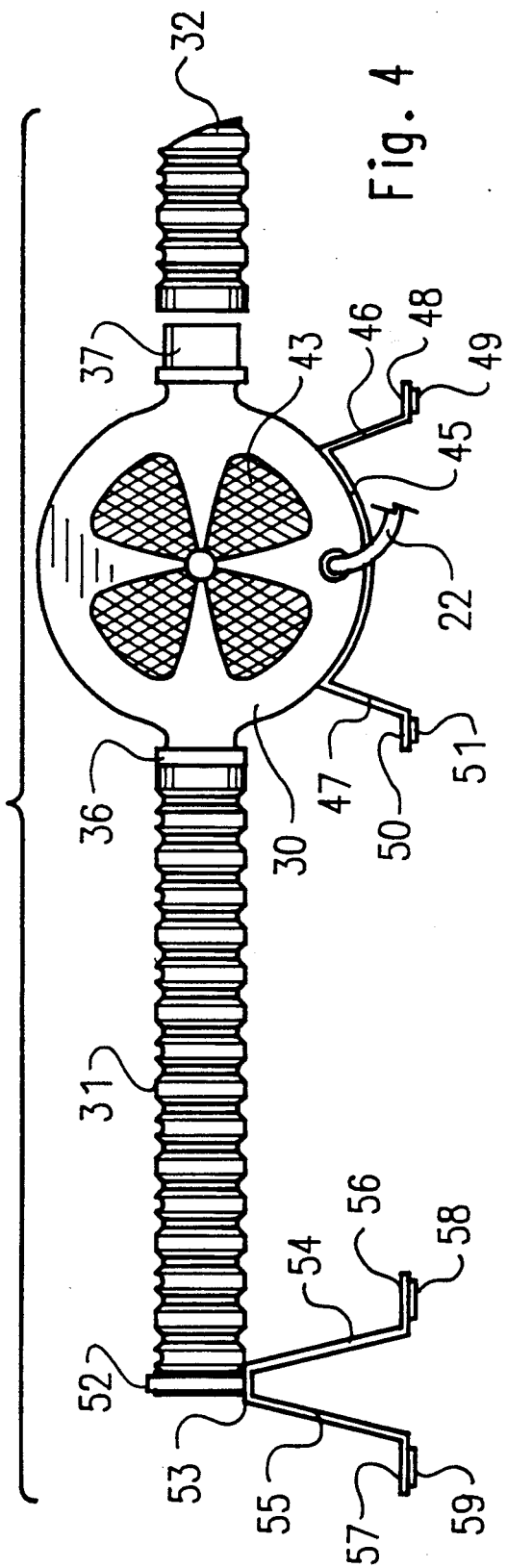
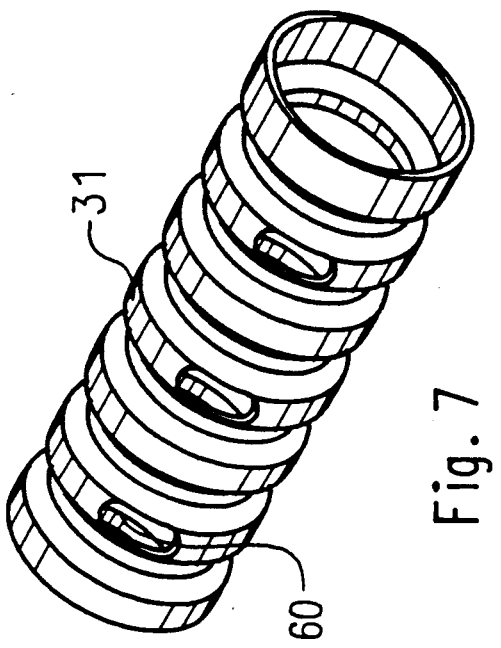
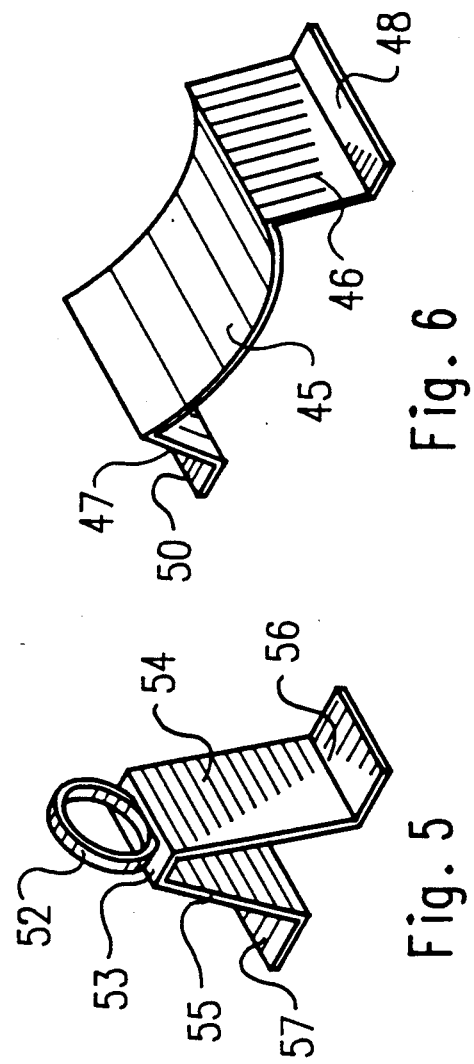

VEHICLE HEATING DEVICE

BACKGROUND OF THE INVENTION

1. Field of the Invention

The present invention relates to vehicle heating devices, and more particularly pertains to a vehicle heating device which may be easily transported for use in a variety of different vehicles. In cold climate regions, vehicles parked outside and in unheated garages naturally become quite cold. The vehicle interior become so cold as to be uncomfortable for a vehicle occupant to enter. Additionally, the vehicle windows and windshield frequently become covered with a layer of frost or ice. This requires an individual to tediously scrape the accumulated ice from the windshield prior to use of the vehicle. In order to overcome this problem, the present invention provides a portable, battery operated vehicle interior heating device which includes a timer allowing activation immediately prior to intended vehicle use.

2. Description of the Prior Art

Various types of vehicle heating devices are known in the prior art. A typical example of such a vehicle heating device is to be found in U.S. Pat. No. 2,102,418, which issued to B. Kirsch on Dec. 14, 1937. This patent discloses a pair of electric fans pivotally mounted by a bracket on a steering column of a vehicle. U.S. Pat. No. 2,121,753, which issued to E. Cornell, Jr. on June 21, 1938, discloses a vehicle window defrosting device having an elongated vent conduit provided with a plurality of spaced vent apertures and secured to a vehicle windshield interior surface by suction cups. An electric blower assembly is operative to force air through the vent conduit. U.S. Pat. No. 2,415,740, which issued to J. Gammack on Feb. 11, 1947, discloses a vehicle window defroster having a flexible vent conduit connected to an outlet nozzle adapted for securement to an interior window surface by a suction cup. U.S. Pat. No. 3,745,906, which issued to J. Kakei et al on July 17, 1973, discloses a defroster for defrosting a windshield of a motor vehicle. The defroster has a nozzle having a generally rectangular laterally elongated cross section which is gradually enlarged towards an outlet opening formed at the foremost end of the nozzle. A hot fluid jet is passed through this defroster nozzle and is sprayed onto the windshield through the outlet opening. The path of the fluid jet issuing from the defroster nozzle is periodically switched from one side of the defroster nozzle to the other such that the fluid jet is caused to move from side to side. U.S. Pat. No. 4,105,246, which issued to G. Trumbull on Aug. 8, 1978, discloses a vehicle windshield defroster for attachment to a vehicle dashboard. The device consists of a rectangular panel pivotally movable between positions approximately parallel to the top of the dashboard and to the windshield for functioning as a glare shield in a defroster air deflector.

While the above mentioned devices are directed to vehicle heating and defrosting devices, none of these devices disclose a portable vehicle interior heating and defrosting device which includes a rechargeable battery and a timer for heating a vehicle interior and defrosting vehicle windows at a predetermined time, immediately prior to vehicle use. Inasmuch as the art is relatively crowded with respect to these various types of vehicle heating devices, it can be appreciated that there is a continuing need for and interest in improvements to such vehicle heating devices, and in this respect, the present invention addresses this need and interest.

SUMMARY OF THE INVENTION

In view of the foregoing disadvantages inherent in the known types of vehicle heating devices now present in the prior art, the present invention provides an improved vehicle heating device. As such, the general purpose of the present invention, which will be described subsequently in greater detail, is to provide a new and improved vehicle heating device which has all the advantages of the prior art vehicle heating devices and none of the disadvantages.

To attain this, a representative embodiment of the concepts of the present invention is illustrated in the drawings and makes use of a vehicle heating device which includes a housing containing a rechargeable battery in a recharging unit which is selectively connectable to an AC or a DC power supply source for maintaining the battery in a charged condition. The housing is in the form of a case having a hinged lid and an interior provided with a plurality of storage receptacles for storing and transporting a blower assembly and a pair of vent conduits. The blower assembly includes an electric fan for discharging air through two heated air outlet apertures. Preferably, electrical resistance heating elements are utilized to heat air within the blower assembly. The vent conduits comprise elongated flexible corrugated tubes each provided with a plurality of spaced vent apertures. The vent conduits are removably connectable to the blower assembly air outlet apertures. In use, the blower assembly and vent conduits are supported in spaced relation above a vehicle dashboard by a plurality of support stands. A power cord connects the blower assembly to the rechargeable battery, and a timer in the housing may be set to activate the blower fan and heating elements at a predetermined time to heat the interior of a vehicle and to defrost the vehicle windshield.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially those who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle heating device which has all the advantages of the prior art vehicle heating devices and none of the disadvantages.

It is another object of the present invention to provide a new and improved vehicle heating device which may be easily and efficiently manufactured and marketed.

It is a further object of the present invention to provide a new and improved vehicle heating device which is of a durable and reliable construction.

An even further object of the present invention is to provide a new and improved vehicle heating device which is susceptible of a low cost of manufacture with regard to both materials and labor, and which accordingly is then susceptible of low prices of sale to the consuming public, thereby making such vehicle heating devices economically available to the buying public.

Still yet another object of the present invention is to provide a new and improved vehicle heating device which provides in the apparatuses and methods of the prior art some of the advantages thereof, while simultaneously overcoming some of the disadvantages normally associated therewith.

Still another object of the present invention is to provide a new and improved vehicle heating device which is easily portable for use in a variety of different vehicles.

Yet another object of the present invention is to provide a new and improved vehicle heating device including a timer for enabling a vehicle interior and vehicle windows to be heated and defrosted immediately prior to intended vehicle use.

Even still another object of the present invention is to provide a new and improved vehicle heating device having a rechargeable battery power source which serves as an emergency heat source in cold climate regions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an elevational view illustrating the heater blower assembly and air vent outlet conduits.

FIG. 5 is a perspective view which illustrates the heater vent conduit support stand.

FIG. 6 is a perspective view which illustrates the heater blower assembly support stand.

FIG. 7 is a perspective view which illustrates the construction of the heater vent conduit.

DESCRIPTION OF THE PREFERRED EMBODIMENT

Figure 1:
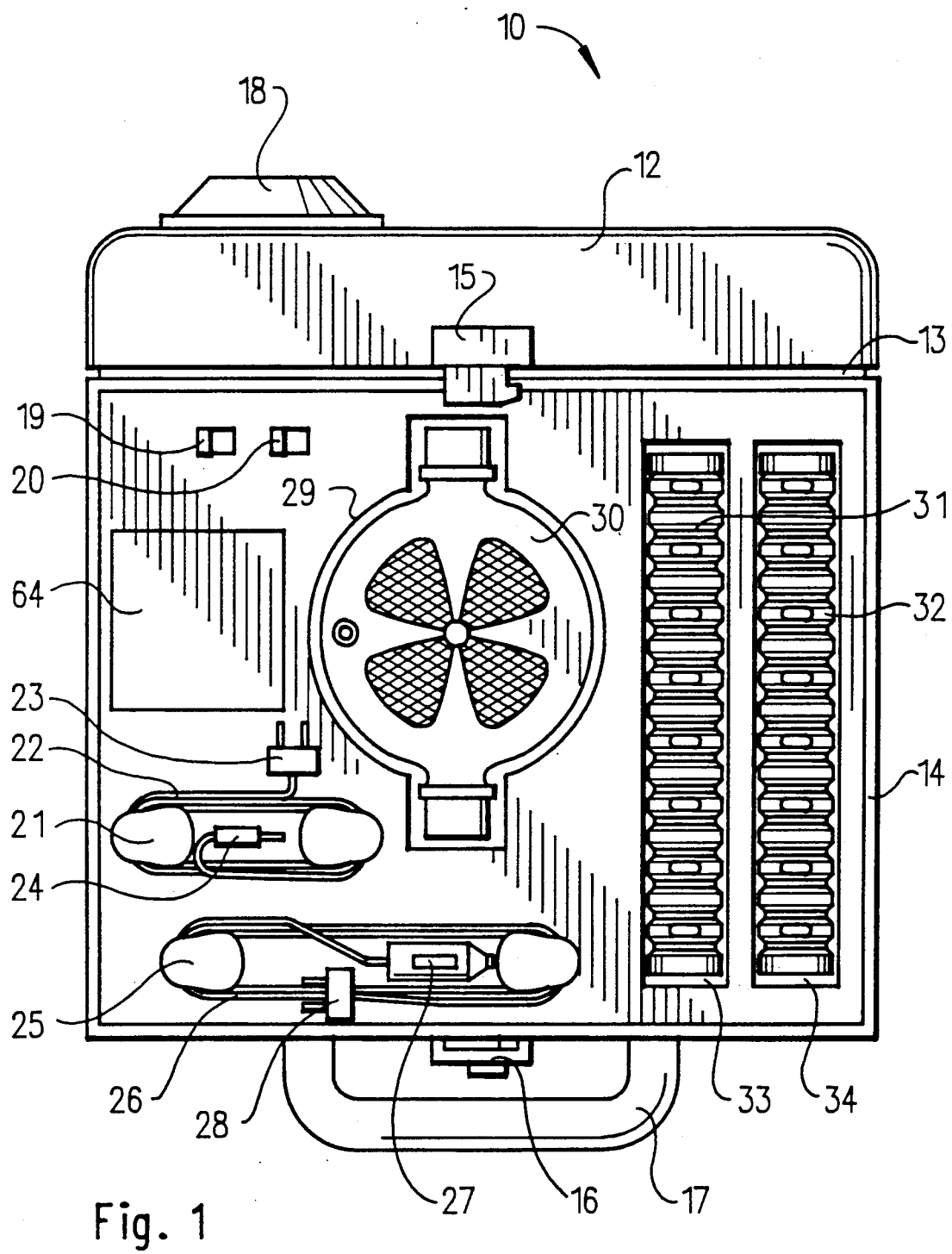
FIG. 1 is a top plan view of the vehicle heating device of the present invention, with the storage case lid in an open position.

With reference now to the drawings, and in particular to FIG. 1 thereof, a new and improved vehicle heating device embodying the principles and concepts of the present invention and generally designated by the reference numeral 10 will be described.

More specifically, it will be noted that the first embodiment 10 of the invention includes a housing 14. The housing 14 is preferably in the form of a portable storage case having a lid 12 connected by a hinge 13. Cooperating latches 15 and 16 are provided on the lid 12 and case 14 for securing the lid 12 in a closed position. A handle 17 is secured to the case 14 for conveniently transporting the case 14 and contents thereof. As shown, a manually settable timer dial 18 is provided on an exterior top surface of the lid 12. A pair of slide switches 19 and 20 are located within the interior of the case or housing 14. The switch 19 is preferably a double throw type switch for selectively connecting an interior battery recharging unit to an AC or a DC power supply source for recharging a battery located within the case 14. The battery 64 is preferably removably mounted within the case 14 to allow removal and replacement if required. The switch 20 is an ON/OFF switch operative to connect the timer 18 to the battery 64. The electrical components of the present invention will be described subsequently in greater detail. A first power cord storage clip 21 is formed within the case 14 and is designed to store a first power cord 22 having electrical connectors 23 and 24 formed at opposite ends. A second power cord storage clip 25 is adapted for storing a second power cord 26 having electrical connectors 27 and 28 formed at opposite ends. The electrical connector 27 is dimensioned for insertion into a conventional vehicle cigarette lighter socket. A generally circular recess 29 is dimensioned for insertion of a blower assembly housing 30. A pair of elongated rectangular recesses 33 and 34 receive elongated cylindriCal vent conduits 31 and 32.

Figure 2:
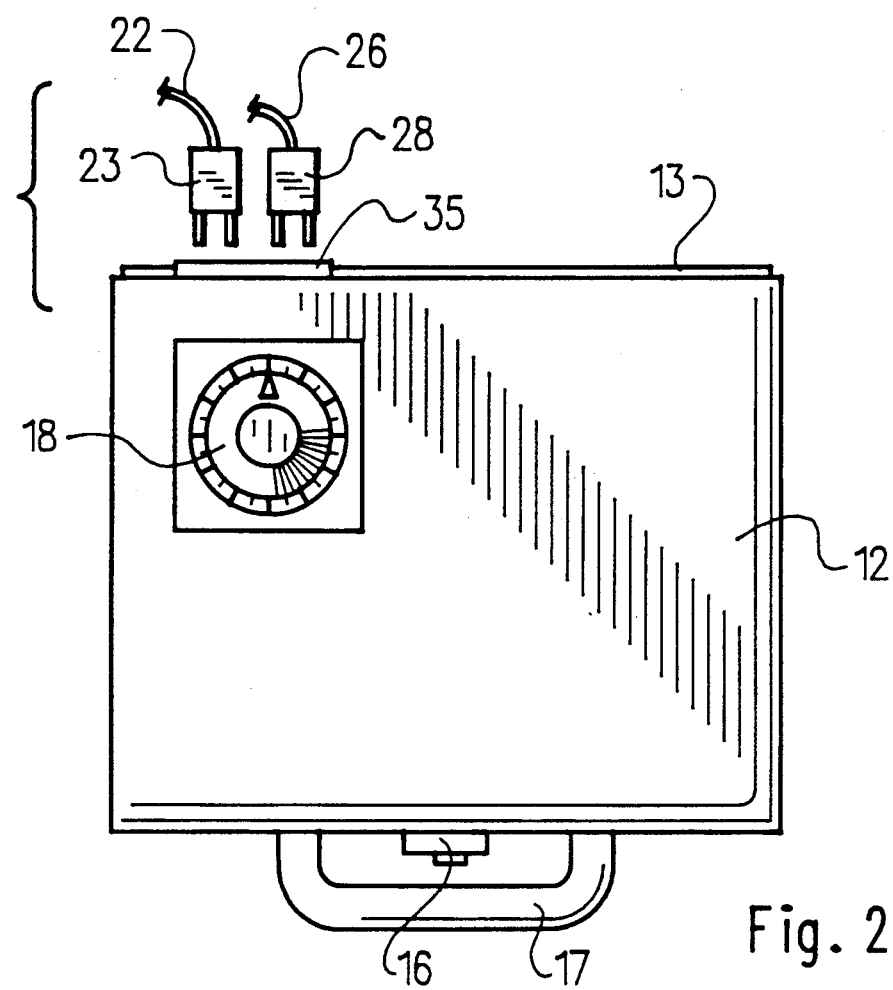
FIG. 2 is a top plan view of the storage case in closed position.

FIG. 2 illustrates the lid 12 in a closed position. A connection strip 35 is formed on a back wall of the lid 12, or alternatively, the case 14, and is provided with conventional electrical connection sockets dimensioned for engagement with the electrical connectors 23 and 28 on the cords 22 and 26.

Figure 3:
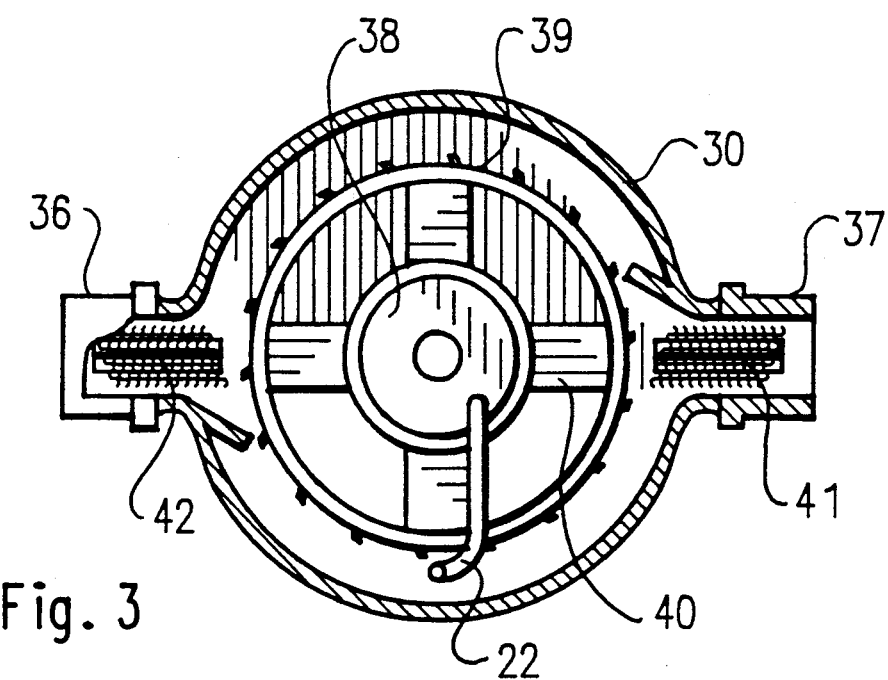
FIG. 3 is a cross sectional view illustrating the construction of the heater blower assembly.

FIG. 3 is a cross sectional view which illustrates the internal construction of the blower assembly 30. An electrical motor 38 is operative to drive a conventional squirrel-cage type fan 39. A pair of conventional electrical resistance heating elements 41 and 42 are disposed within air outlet apertures 36 and 37 situated at opposite sides of the blower assembly housing 30. The electric motor 38 is of a 12 volt DC type and is connected to the rechargeable battery within the case 14 by the power cord 22.

As shown in FIG. 4, the blower assembly 30 is adapted to be supported in spaced relation above a horizontal surface such as a vehicle dashboard, through the use of a support stand 45. The blower assembly 30 includes an air intake 43 for inducting air from a vehicle interior. The support stand 45 includes a cylindrically curved concave upper surface having oppositely diverging legs 46 and 47. Flange portions 48 and 50 include resilient pads 49 and 51 for engagement with a horizontal surface. In this fashion, the supporting surface is protected from heat damage by the blower assembly 30. The vent conduits 31 and 32 are removably connected by a friction fit type connection with the outlet apertures 36 and 37 on the blower assembly 30. Each of the vent conduits include a support stand 53 having a circular ring 52 which receives a free end portion of the vent conduit, for example 31. The ring 52 is connected to a generally V-shaped body formed by diverging legs 54 and 55. The legs 54 and 55 include oppositely directed flange portions 56 and 57. The flange portions 56 and 57 each have resilient pads 58 and 59 adapted for engagement with a horizontal supporting surface.

FIG. 5 is a perspective view which further illustrates the construction of the vent conduit support stand 53.

FIG. 6 is a perspective view which further illustrates the construction of the blower assembly support stand 45.

FIG. 7 illustrates a perspective view of the vent conduit 31. The vent conduit 31 is preferably formed from a flexible corrugated material such as rubber or plastic, and is provided with a plurality of spaced air outlet apertures 60.

Figure 8:
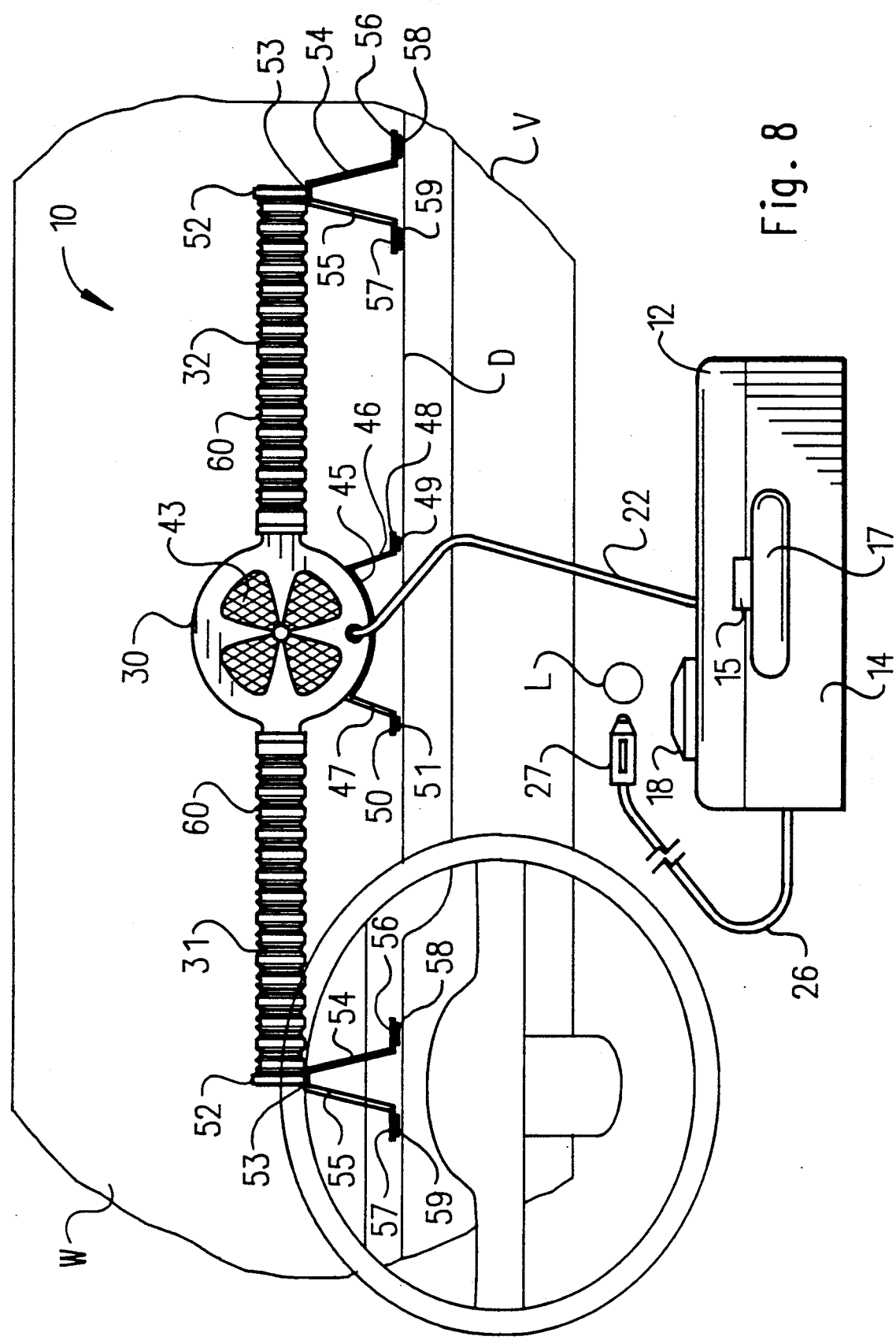
FIG. 8 is a diagrammatic view which illustrates the manner of using the vehicle heating device of the present invention in the interior of a conventional vehicle.

FIG. 8 illustrates the manner of use of the heating device 10 within the interior of a conventional vehicle V. The blower assembly 30 and vent conduits 31 and 32 are supported above the vehicle dashboard D by the support stands 53 and 45. The outlet apertures 60 in the vent conduits 31 and 32 direct heated air from the blower assembly 30 onto the vehicle windshield W and into the vehicle interior. The rechargeable battery in the portable case 14 may be connected to the vehicle cigarette lighter socket L utilizing the cord 26 and electrical connector 27. In use, the timer 18 is set to actuate the blower assembly 30 internal fan and heating elements. Thus, an individual may set the timer 18 to actuate the vehicle heating device 10, a short time prior to intended vehicle use. When the individual initially enters the vehicle interior, the windshield will then be defrosted and the vehicle interior warmed to a comfortable level. In addition to functioning as a timed vehicle interior heating and windshield defrosting device, the vehicle heating device 10 may be utilized as an emergency heating device in the event of engine failure during cold temperature conditions.

Figure 9:
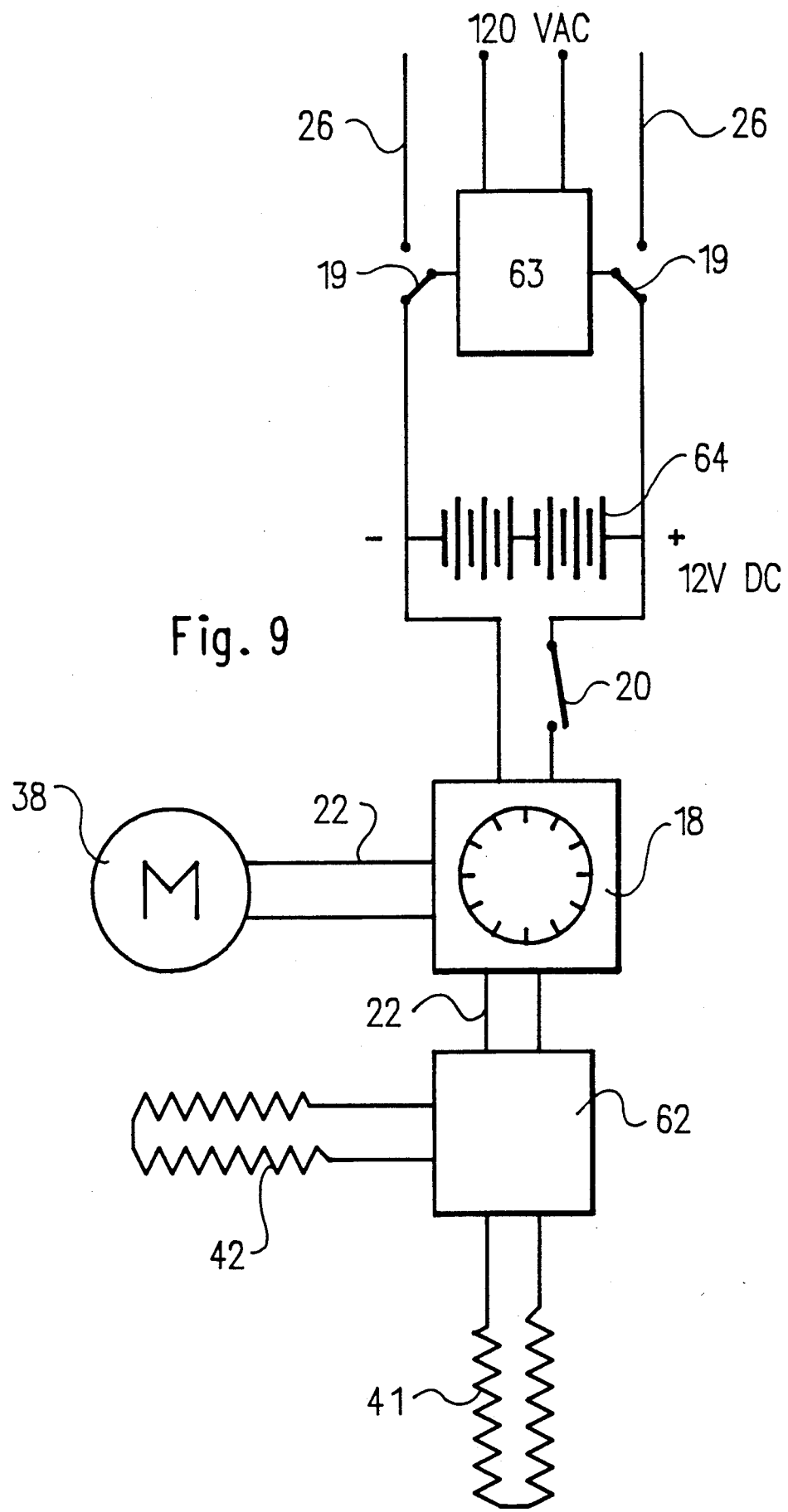
FIG. 9 is a schematic diagram illustrating the electrical components of the vehicle heating device of the present invention.

FIG. 9 illustrates the electrical components utilized in the heating device 10. The power cord 26 may be utilized to connect a recharging unit 63 to a 12 V DC power supply. Alternatively, the recharging unit 63 may be connected to a 120 V AC power supply source. The recharging unit 63 includes a conventional transformer for reducing the voltage and a conventional rectifier for converting the AC input to a DC output. The double pull switch 19 is operative to connect the rechargeable battery 64 to a DC power supply through the cord 26, or in the illustrated position, to the AC recharging unit 63. The ON/OFF switch 20 allows the battery 64 to be selectively connected to the timer 18. The timer 18 includes conventional circuitry operative to actuate the motor 38 and electrical resistance heating elements 41 and 42 simultaneously, at a predetermined time. The heating elements 41 and 42 may be connected to a conventional thermostatic control 62 to prevent overheating.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle heating device, comprising:
   a housing;
   a rechargeable battery in said housing;
   a recharging unit in said housing for recharging said battery;
   means for selectively connecting said recharging unit to an AC or a DC power supply source;
   a blower assembly;
   an electric fan in said blower assembly;
   at least one electrical resistance heating element in said blower assembly;
   a pair of heated air outlet apertures provided on opposite sides of said blower assembly;
   a pair of flexible corrugated elongated tubular vent conduits connected to respective ones of said heated air outlet apertures;
   each of said vent conduits having a plurality of spaced vent apertures;
   a first support stand for supporting said blower assembly in spaced relation above a vehicle dashboard;
   second and third support stands for supporting said vent conduits in spaced relation above a vehicle dashboard;
   means for connecting said electrical resistance heating element and said fan to said battery;
   timing means in said housing for actuating said fan and heating element at a predetermined time; and
   a plurality of compartments in said housing dimensioned for removable reception of said blower assembly and said vent conduits.

2. The vehicle heating device of claim 1, further comprising means for connecting said recharging unit to a conventional vehicle cigarette lighter socket.

3. The vehicle heating device of claim 1, wherein said housing comprises a case having a hinged lid and an interior portion provided with storage receptacles for said blower assembly and sand vent conduit.

4. The vehicle heating device of claim 1, wherein said first support stand includes a cylindrically curved concave upper surface having oppositely diverging legs, and flange portions on said legs each having resilient pads for engagement with a generally horizontal dashboard surface.

5. The vehicle heating device of claim 1, wherein said second and third support stands each include a circular ring dimensioned for engagement with one end of one of said vent conduits, a generally V-shaped body formed by diverging legs connected to said ring, and oppositely directed flange portions on said legs, each of said flange portions provided with a resilient pad for engagement with a generally horizontal dashboard surface.

* * * * *